(12) United States Patent
Subramanya et al.

(10) Patent No.: US 9,984,058 B2
(45) Date of Patent: *May 29, 2018

(54) IDENTIFYING TASKS IN MESSAGES

(71) Applicant: Google Inc., Mountain View, CA (US)

(72) Inventors: Amarnag Subramanya, Sunnyvale, CA (US); Edgar Gonzalez Pellicer, San Francisco, CA (US); Shalini Agarwal, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/429,991

(22) Filed: Feb. 10, 2017

(65) Prior Publication Data

US 2017/0154024 A1 Jun. 1, 2017

Related U.S. Application Data

(63) Continuation of application No. 14/161,368, filed on Jan. 22, 2014, now Pat. No. 9,606,977.

(51) Int. Cl.
  *G06F 17/27* (2006.01)
  *G06F 17/20* (2006.01)
  *G06F 17/24* (2006.01)
  *G06Q 10/10* (2012.01)
  *H04L 12/58* (2006.01)
  *H04M 1/725* (2006.01)

(52) U.S. Cl.
  CPC .......... *G06F 17/243* (2013.01); *G06F 17/241* (2013.01); *G06F 17/274* (2013.01); *G06Q 10/107* (2013.01); *G06Q 10/1097* (2013.01); *H04L 51/08* (2013.01); *H04M 1/72552* (2013.01)

(58) Field of Classification Search
  None
  See application file for complete search history.

(56) References Cited

U.S. PATENT DOCUMENTS

| 4,688,195 A | * | 8/1987 | Thompson | G06F 3/0489 706/11 |
| 5,056,021 A | * | 10/1991 | Ausborn | G06F 17/2795 704/9 |

(Continued)

FOREIGN PATENT DOCUMENTS

| JP | H11136278 | 5/1999 |
| JP | 2005316953 | 11/2005 |

(Continued)

OTHER PUBLICATIONS

The Japan Patent Office, Office Action for Japanese Patent Application No. 2016-547883, 8 pages dated Aug. 28, 2017.

(Continued)

*Primary Examiner* — Marcus T Riley
(74) *Attorney, Agent, or Firm* — Middleton Reutlinger

(57) ABSTRACT

Methods and apparatus are described herein for identifying tasks in messages. In various implementations, natural language processing may be performed on a received message to generate an annotated message. The annotated message may be analyzed pursuant to a grammar. A portion of the message may be classified as a user task entry based on the analysis of the annotated message.

20 Claims, 5 Drawing Sheets

(56) References Cited

U.S. PATENT DOCUMENTS

| | | | |
|---|---|---|---|
| 5,237,502 A * | 8/1993 | White | G06F 17/2705 704/1 |
| 5,442,780 A * | 8/1995 | Takanashi | G06F 17/3043 |
| 5,603,054 A | 2/1997 | Theimer et al. | |
| 5,748,974 A * | 5/1998 | Johnson | G06F 3/038 704/9 |
| 6,081,774 A * | 6/2000 | de Hita | G06F 17/30663 704/9 |
| 6,115,709 A | 9/2000 | Gilmour et al. | |
| 6,438,543 B1 | 8/2002 | Kazi et al. | |
| 6,842,877 B2 | 1/2005 | Robarts et al. | |
| 7,475,010 B2 * | 1/2009 | Chao | G06F 17/277 704/10 |
| 7,496,500 B2 | 2/2009 | Reed et al. | |
| 7,702,631 B1 | 4/2010 | Basu et al. | |
| 7,813,916 B2 | 10/2010 | Bean | |
| 8,046,226 B2 | 10/2011 | Soble et al. | |
| 8,055,707 B2 | 11/2011 | Desai et al. | |
| 8,108,206 B2 | 1/2012 | Hufnagel et al. | |
| 8,364,467 B1 * | 1/2013 | Bowman | G06F 17/2765 704/1 |
| 8,375,099 B2 * | 2/2013 | Carroll | G06Q 10/107 709/206 |
| 8,417,650 B2 | 4/2013 | Graepel et al. | |
| 8,521,818 B2 | 8/2013 | McGann et al. | |
| 8,560,487 B2 | 10/2013 | Jhoney et al. | |
| 8,599,801 B2 | 12/2013 | Baio et al. | |
| 9,606,977 B2 * | 3/2017 | Subramanya | G06F 17/243 |
| 2003/0004706 A1 * | 1/2003 | Yale | G06F 17/27 704/9 |
| 2004/0199499 A1 * | 10/2004 | Lazaridis | G06F 17/2765 |
| 2007/0106495 A1 * | 5/2007 | Ramsey | G06F 17/278 704/9 |
| 2007/0106496 A1 * | 5/2007 | Ramsey | G06F 17/277 704/9 |
| 2009/0113415 A1 | 4/2009 | Wilbrink et al. | |
| 2009/0307212 A1 | 12/2009 | Ramot et al. | |
| 2010/0004922 A1 | 1/2010 | Bradley et al. | |
| 2010/0100815 A1 | 4/2010 | Hutchinson et al. | |
| 2010/0179961 A1 | 7/2010 | Berry et al. | |
| 2011/0016421 A1 * | 1/2011 | Krupka | G06F 17/27 715/780 |
| 2011/0071819 A1 * | 3/2011 | Miller | G06F 17/273 704/9 |
| 2012/0005221 A1 | 1/2012 | Ickman et al. | |
| 2012/0030588 A1 | 2/2012 | Sinha | |
| 2012/0150532 A1 | 6/2012 | Mirowski et al. | |
| 2012/0192096 A1 | 7/2012 | Bowman et al. | |
| 2012/0239761 A1 | 9/2012 | Linner et al. | |
| 2012/0317499 A1 | 12/2012 | Shen | |
| 2012/0331036 A1 | 12/2012 | Duan et al. | |
| 2013/0007648 A1 | 1/2013 | Gamon et al. | |
| 2013/0073662 A1 | 3/2013 | Meunier et al. | |
| 2013/0138622 A1 | 5/2013 | Ayers et al. | |
| 2013/0159270 A1 | 6/2013 | Urmy et al. | |
| 2013/0290436 A1 | 10/2013 | Martin et al. | |
| 2013/0297551 A1 * | 11/2013 | Smith | G06N 5/02 706/48 |
| 2014/0207716 A1 * | 7/2014 | Hsu | G06N 99/005 706/12 |
| 2014/0372102 A1 * | 12/2014 | Hagege | G06F 17/278 704/9 |
| 2015/0205782 A1 * | 7/2015 | Subramanya | G06Q 10/107 704/9 |
| 2017/0154024 A1 * | 6/2017 | Subramanya | G06F 17/243 |

FOREIGN PATENT DOCUMENTS

| | | |
|---|---|---|
| JP | 2007199768 | 8/2007 |
| JP | 2012502575 | 1/2012 |
| RU | 2005120363 A | 1/2007 |
| WO | 2011163064 | 12/2011 |

OTHER PUBLICATIONS

Corston-Oliver, Simon et al, "Task-Focused Summarization of Email," Microsoft Research Jul. 2004, (http://www1.cs.columbia.edu/~lokesh/pdfs/Corston.pdf), 8 pages.

Laclavik, et al., "Email Analysis and Information Extraction for Enterprise Benefit," Institute of Informatics, Slovak Academy of Sciences, Slovakia, Computing and Informatics, vol. 30, 2011, pp. 57-87.

International Search Report and Written Opinion of PCT Ser. No. PCT/US15/12044 dated Jun. 2, 2015.

European Patent Office; Communication Pursuant to Article 94(3) EPC for European Patent Application No. 15703363.0, 6 pages, dated Jul. 4, 2017.

The Korean Intellectual Property Office, Office Action for Korean Patent Application No. 10-2016-7022674, 11 pages dated Jun. 21, 2017.

Russian Patent Office; Office Action issued in Appl. No. 2016133850 dated Nov. 7, 2017.

Korean Intellecutal Property Office; Decision of Rejection issued in Appl. No. 10-2016-7022674 dated Dec. 29, 2017.

Korean Intellecutal Property Office; Decision of Rejection issued in Appl. No. 10-2016-7022674 dated Feb. 14, 2018.

Russian Patent Office; Decision to Grant issued in Appl. No. 2016133850 dated Mar. 28, 2018.

European Patent Office; Summons to Attend Oral Proceedings issued in Appl. No. 15703363.0 dated Mar. 19, 2018.

* cited by examiner

IDENTIFYING TASKS IN MESSAGES

BACKGROUND

Users may be inundated with emails texts, voicemails, and/or other messages asking the users to perform various tasks (e.g., "call Sally at 9 am on Tuesday," "prepare report," "make reservations at Sal's on Saturday at 8," etc.). These tasks may be incorporated into messages in various ways such that users may be required to read messages carefully, and possibly re-read some messages, to ensure they fulfill or otherwise handle tasks assigned to them. If users do not create to-do lists, it may be difficult later for users to find tasks assigned to them among myriad messages in various formats (e.g., emails, texts, voicemail, etc.).

SUMMARY

The present disclosure is generally directed to methods, apparatus and computer-readable media (transitory and non-transitory) for identifying tasks in messages and performing various responsive actions. In some implementations, a message may undergo natural language processing to generate an annotated message that includes various information, such as annotated parts of speech, parsed syntactic relationships, annotated entity references, clusters of references to the same entity, and so forth. This annotated message may be analyzed, e.g., pursuant to a grammar having one or more rule paths, to determine whether a portion of the message qualifies for classification as a task, and if so, what type of task it should be classified as. In various implementations, a suitable user interface may be identified, and in some cases launched or opened, based on the task type classification, the annotated message output from natural language processing, and other data sources.

In some implementations, a computer implemented method may be provided that includes: analyzing, by a computing system, content of a message addressed to a user, wherein the message was not composed by the user; classifying, by the computing system, a portion of the content of the message as a task assigned to the user by the one or more other individuals based on the analysis of the message; selecting by the computing system from a plurality of distinct user interfaces associated with a plurality of distinct software applications, based on the analysis of the content of the message, a user interface operable by the user to fulfill the task; and automatically populating, by the computing system, one or more data entry fields of the selected user interface that are editable by the user with information based on the analysis of the content of the message.

This method and other implementations of technology disclosed herein may each optionally include one or more of the following features.

In various implementations, the analyzing may include analyzing, by the computing system, the content of the message pursuant to a plurality of rule paths of a grammar to generate a plurality of candidate user tasks and associated scores; and the classifying may include selecting, by the computing system, the task from the plurality of candidate user tasks based on the associated scores.

In various implementations, the analyzing may include identifying, by the computing system, a reference to a task interaction entity of the task in the message. In various implementations, the analyzing may include classifying, by the computing system, the task interaction entity as a person, location or organization. In various implementations, the analyzing may include identifying, by the computing system, a task action of the task. In various implementations, selecting the user interface may include selecting the user interface based on the task interaction entity and task action.

In various implementations, the method may further include automatically launching or opening, by the computing system, the user interface. In various implementations, the method may further include comprising selecting, by the computing system from a plurality of distinct URLs, based on the analysis of the annotated message, a URL associated with a network-based resource that is operable by the user to fulfill the task.

In another aspect, a method may include: analyzing, by a computing system, content of a communication of a user; classifying, by the computing system, a portion of the content of the communication as a task assigned to the user based on the analysis of the content of the communication; selecting by the computing system from an index of distinct user interfaces associated with a plurality of distinct software applications, based on the analysis of the content of the communication, at least one user interface operable by the user to fulfill the task; and providing, by the computing system as visual output, at least one visual prompt corresponding to the at least one user interface operable by the user to fulfill the task.

In yet another aspect, a method may include: analyzing, by a computing system, content of a communication sent to a user, wherein the communication was not composed by the user; identifying, by the computing system based on the analyzing, a plurality of candidate user tasks assigned to the user; selecting by the computing system from an index of distinct user interfaces associated with a plurality of distinct software applications, based on the identifying, a respective one or more user interfaces operable by the user to fulfill the plurality of candidate user tasks; and providing, by the computing system as output, a plurality of prompts corresponding to the one or more user interfaces operable by the user.

Other implementations may include a non-transitory computer readable storage medium storing instructions executable by a processor to perform a method such as one or more of the methods described above. Yet another implementation may include a system including memory and one or more processors operable to execute instructions, stored in the memory, to perform a method such as one or more of the methods described above.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
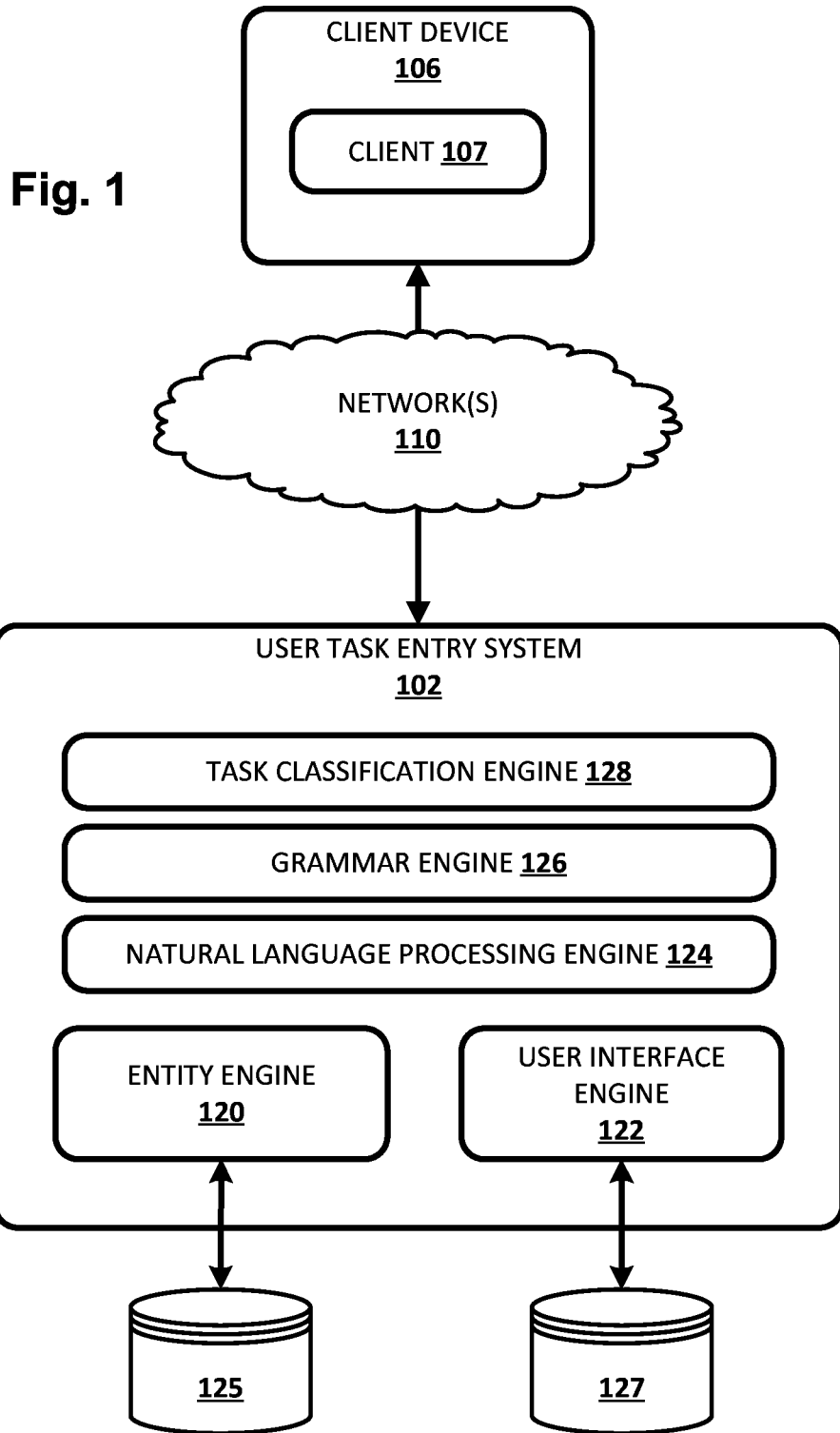
FIG. 1 illustrates an example environment in which tasks may be identified in messages.

FIG. 1 illustrates an example environment in which tasks may be identified in messages. The example environment includes a client device 106 and a user task entry system 102. User task entry system 102 may be implemented in one or more computers that communicate, for example, through a network (not depicted). User task entry system 102 may be an example of a system in which the systems, components, and techniques described herein may be implemented and/or with which systems, components, and techniques described herein may interface. Although described as being implemented in large part on a "user task entry system" herein, disclosed techniques may actually be performed on systems that serve various other purposes, such as email systems, text messaging systems, social networking systems, voice mail systems, productivity systems, enterprise software, search engines, and so forth.

A user may interact with user task entry system 102 via client device 106. Other computer devices may communicate with user task entry system 102, including but not limited to additional client devices and/or one or more servers implementing a service for a website that has partnered with the provider of user task entry system 102. For brevity, however, the examples are described in the context of client device 106.

Client device 106 may be a computer in communication with user task entry system 102 through a network such as a local area network (LAN) or wide area network (WAN) such as the Internet (one or more such networks indicated generally at 110). Client device 106 may be, for example, a desktop computing device, a laptop computing device, a tablet computing device, a mobile phone computing device, a computing device of a vehicle of the user (e.g., an in-vehicle communications system, an in-vehicle entertainment system, an in-vehicle navigation system), or a wearable apparatus of the user that includes a computing device (e.g., a watch of the user having a computing device, glasses of the user having a computing device, a wearable music player). Additional and/or alternative client devices may be provided. Client device 106 may execute one or more applications, such as client application 107, that enable a user to receive and consume messages, create task lists, and perform various actions related to task fulfillment. As used herein, a "message" may refer to an email, a text message (e.g., SMS, MMS), an instant messenger message, a voicemail, or any other incoming communication that is addressed to a user and that is capable of undergoing natural language processing.

In some implementations, client device 106 and user task entry system 102 each include memory for storage of data and software applications, a processor for accessing data and executing applications, and components that facilitate communication over network 110. The operations performed by client device 106 and/or user task entry system 102 may be distributed across multiple computer systems. User task entry system 102 may be implemented as, for example, computer programs running on one or more computers in one or more locations that are coupled to each other through a network.

In various implementations, user task entry system 102 may include an entity engine 120, a user interface engine 122, a natural language processing (NLP) engine 124, a grammar engine 126, and/or a task classification engine 128. In some implementations one or more of engines 120, 122, 124, 126 and/or 128 may be combined and/or omitted. In some implementations, one or more of engines 120, 122, 124, 126 and/or 128 may be implemented in a component that is separate from user task entry system 102. In some implementations, one or more of engines 120, 122, 124, 126 and/or 128, or any operative portion thereof, may be implemented in a component that is executed by client device 106.

Entity engine 120 may maintain an entity database 125. "Entities" may include but are not limited to people, locations, organizations, actions, objects, and so forth. In various implementations, entity database 125 may include entity data pertinent to a particular user and/or to users globally. For instance, in some implementations, entity database 125 may include a user's contact list, which often may be maintained as a contact list on the user's smart phone and/or on her email. In some such cases, entity database 125 may be implemented additionally or alternatively on client device 106. In some implementations, entity database may include a global network of entities that may or may not be pertinent to all users. In various implementations, global entity data may be populated over time from various sources of data, such as search engines (e.g., and their associated web crawlers), users' collective contact lists, social networking systems, and so forth. In various implementations, entity data may be stored in entity database 125 in various forms, such as a graph, tree, etc.

User interface engine 122 may maintain an index 127 of user interfaces. As used herein, "user interface" may refer to any visual and/or audio interface or prompt with which a user may interact. Some user interfaces may be integral parts of executable software applications, which may be programmed using various programming and/or scripting languages, such as C, C#, C++, Pascal, Visual Basic, Perl, and so forth. Other user interfaces may be in the form of markup language documents, such as web pages (e.g., HTML, XML) or interactive voice applications (e.g., VXML).

In this specification, the term "database" and "index" will be used broadly to refer to any collection of data. The data of the database and/or the index does not need to be structured in any particular way and it can be stored on storage devices in one or more geographic locations. Thus, for example, the indices 125 and/or 127 may include multiple collections of data, each of which may be organized and accessed differently.

As described herein, a user task entry (alternatively referred to simply as a "task") may include an indication of one or more task actions and an indication of one or more task interaction entities. A task action may be an action that a user has interest in completing and/or having completed by one or more other users. For example, a task action may be "buy" and the user may have interest in buying something and/or having another person buy something for the user. A task interaction entity is an entity that is associated with the task action. For example, a task may have a task action of "buy" and a task interaction entity of "bananas," and the purpose of the task may be for the user to buy bananas.

In some implementations, an indication of the task action and/or the task interaction entity in a task entry may include an entity identifier. For example, an indication of the task action "buy" may include an identifier of the entity associated with the action of buying. An entity identifier may be associated with an entity in one or more databases, such as entity database 125. In some implementations, an indication of the task action and/or the task interaction entity in a user task entry may additionally or alternatively include one or more terms associated with the task action and/or the task interaction entity. For example, an indication of the task action "buy" may include the terms "buy" and/or "purchase".

User task entry system 102 may be configured to identify and/or classify user task entries within messages based at least in part on analysis of the messages pursuant to a grammar. However, designing a grammar capable of facilitating such analysis may be impracticable. Messages may contain virtually any word of any language in any arrangement. Accordingly, NLP engine 124 may be configured to first perform natural language processing on messages to provide what will be referred to herein as an "annotated message." The annotated message may include various types and levels of annotations for various aspects of the message. These annotations may clarify various aspects of the message, relationships between terms and sections of the message, and so forth, so that designing a grammar suitable for analyzing messages to identify and/or classify tasks may become practicable. In various implementations, the annotated message may be organized into one or more data structures, including but not limited to trees, graphs, lists (e.g., linked list), arrays, and so forth.

Figure 2:
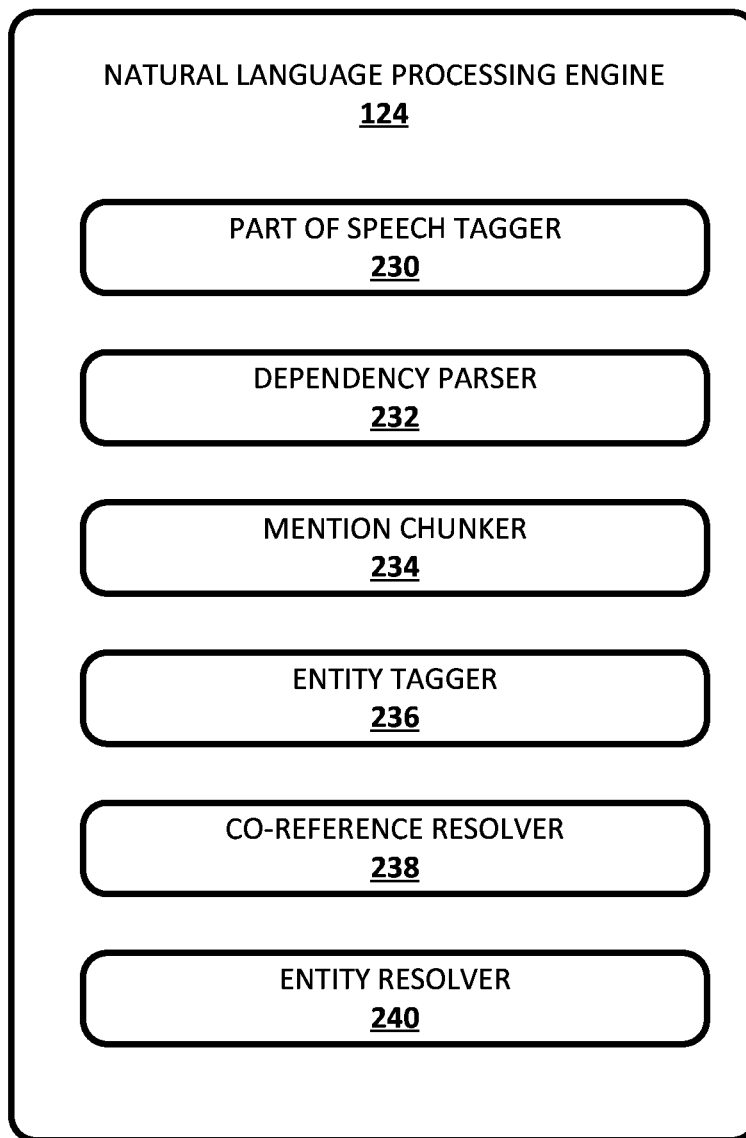
FIG. 2 depicts example components of a natural language processing engine.

Annotations that may be provided by NLP engine 124 as part of the annotated message may be best understood with reference to FIG. 2, which depicts components of an example NLP engine 124. NLP engine 124 may include a part of speech tagger 230, which may be configured to annotate, or "tag," words of the message with its grammatical role. For instance, part of speech tagger 230 may tag each word with its part of speech, such as "noun," "verb," "adjective," "pronoun," etc.

In some implementations, NLP 124 may also include a dependency parser 232. Dependency parser 232 may be configured to determine syntactic relationships between words of the message. For example, dependency parser 232 may determine which words modify which others, subjects and verbs of sentences, and so forth. Dependency parser 232 may then make suitable annotations of such dependencies.

In some implementations, NLP 124 may include a mention chunker 234. Mention chunker 234 may be configured to identify and/or annotate references or "mentions" to entities, including task interaction entities, in the message. For example, mention chunker 234 may determine to which person, place, thing, idea, or other entity each noun or personal pronoun refers, and may annotate, or "tag," them accordingly. As another example, mention chunker 234 may be configured to associate references to times and/or dates to specific times or dates. For instance, assume a message contains the sentence, "Can you pick up some milk on your way home tonight?" Mention chunker 234 may associate the word "tonight" with today's date, and with a particular time (e.g., after 5 pm). In some embodiments, mention chunker 234 may determine, e.g., from a user's calendar, when the user is leaving work, and may associate that time with the word "tonight." One or more downstream components may use this information to create, or help a user create, an appropriate calendar entry and/or to make sure the user receives a reminder at an appropriate time (e.g., while driving home).

In some implementations, NLP 124 may include a named entity tagger 236. Named entity tagger 236 may be configured to annotate, or "tag," entity references in the annotated message as a person, location, organization, and so forth. In some implementations, named entity tagger 236 may identify one or more task actions of the user task entry. In other implementations, one or more other components depicted in FIG. 2 or elsewhere in the figures may be configured to identify one or more task actions of the user task entry.

In some implementations, NLP 124 may include a coreference resolver 238. Coreference resolver 238 may be configured to group, or "cluster," references to the same entity based on various contextual cues contained in the message. For example, "Reagan," "the President," and "he" in a message may be grouped together. In some implementations, coreference resolver 238 may use data outside of a body or subject of a message, e.g., metadata, to cluster references. For instance, an email or text may only contain a reference to "you" (e.g., "can you pick up milk on the way home tonight"). In such case, coreference resolver 238 (or another component, in different implementations) may resolve the reference to "you" to a person to which the email or text is addressed.

In some implementations, NLP 124 may also include an entity resolver 240. Entity resolver 240 may be configured to communicate with entity engine 120 to determine whether entities referenced in the message (e.g., by references tagged by mention chunker 234) are entities that are contained in entity database 125.

Referring back to FIG. 1, grammar engine 126 may be configured to analyze the annotated message of NLP engine 124 against a grammar to determine whether a message includes a user task entry. In some implementations, grammar engine 126 may analyze the annotated message pursuant to a plurality of rule paths of the grammar. Each rule path may be associated with one or more potential types of user task entry. Task classification engine 128 may be configured to analyze output of grammar engine 126, and in particular, output of the plurality of rule paths of the grammar, to determine a task type. User interface engine 122 may be configured to identify a user interface associated with the task, e.g., based on various data from various other components of FIG. 1.

Figure 3:
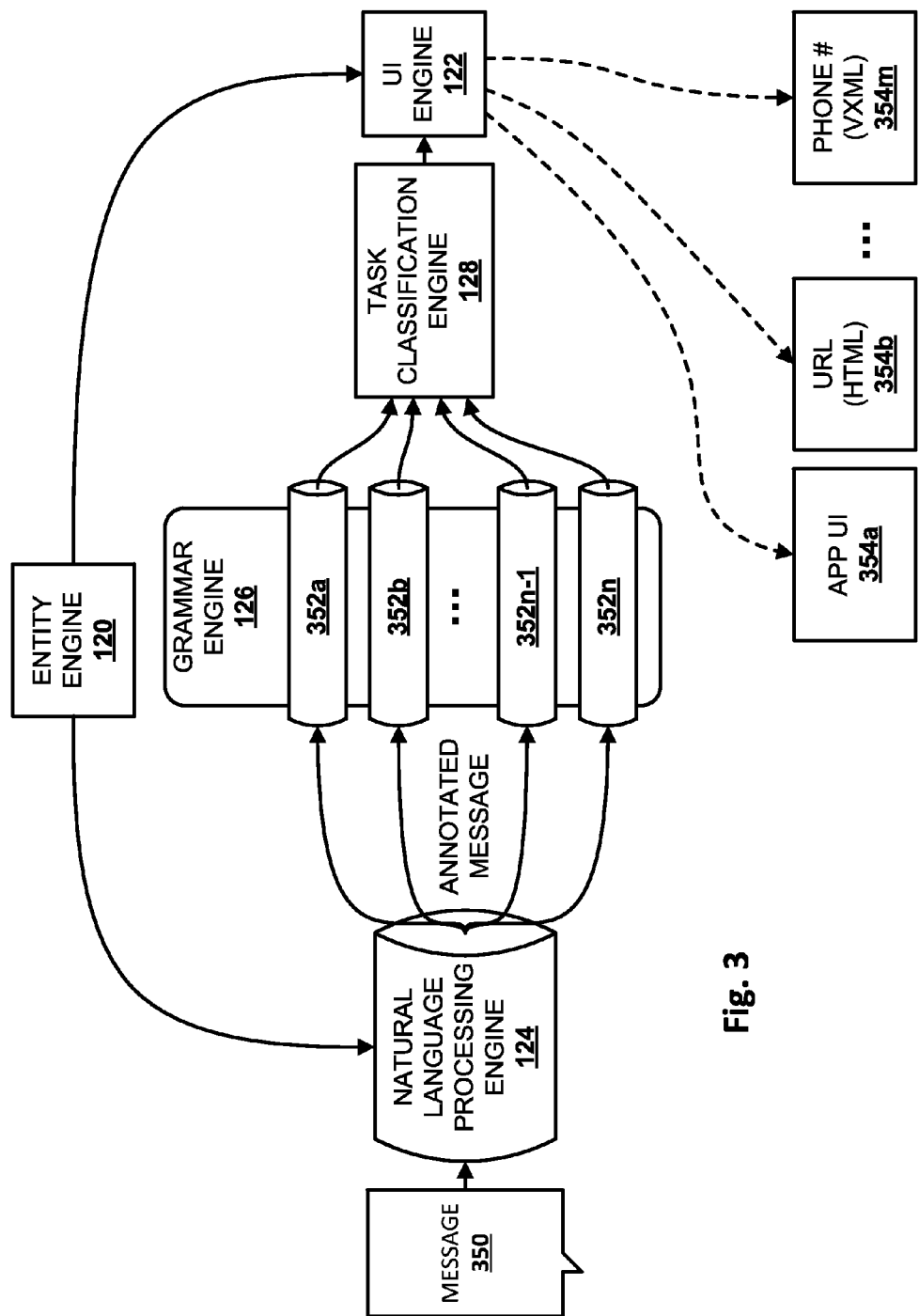
FIG. 3 schematically demonstrates an example of how a message may be analyzed using techniques disclosed herein to identify and/or classify a task, and take responsive action.

FIG. 3 depicts one example process flow for identifying tasks in a message 350. Message 350 may include computer-readable characters and/or symbols, e.g., of an email, text message, etc. Additionally or alternatively, message 350 may include speech-recognized text (e.g., a transcript) of a voicemail or other audio message. Message 350 may be first processed by NLP engine 124 to produce the annotated message. As depicted in FIG. 3, NLP 124 may obtain data from entity engine 120, e.g., by way of entity resolver 240, to perform various analysis. The annotated message output by NLP 124 may be provided as input to a plurality of rule paths, 352a-n (referenced generically by 352), of grammar engine 126. Each rule path 352 may define one or more rules against which the annotated message is compared and judged. In some implementations, the more rules or parameters of a rule path 352 that are satisfied by the annotated message, the higher a score the annotated message will receive from that rule path 352.

For example, assume rule path 352a tests the annotated message for a task action of "confer," a location (e.g., an address), a date and a time. Assume rule path 352b also tests the annotated message for a task action of "confer," a date and a time, but tests for a telephone number instead of a location. If message 350 includes a task, "Make sure you confer with Judy (555-1234) on June $2^{nd}$ at 3 pm about party plans," first rule path 352a may produce a score of three (because three of the four items sought were matched), and second rule path 352b may produce a score of four.

Task classification engine 128 may be configured to receive scores from the plurality of grammar rule paths 352a-n and select the most satisfactory score (e.g., highest).

For example, in the above example, task classification engine 128 would select a type of task associated with rule path 352b. In some implementations, if no score yielded by any rule path 352 satisfies a particular threshold, task classification engine 128 may determine that no user task entries are present in message 350.

UI engine 122 may be configured to identify a user interface associated with fulfillment of the user task entry based on various data. For instance, UI engine 122 may be in communication with entity engine 120 such that it is able to associate a task interaction entity, e.g., tagged by entity tagger 236, with a particular task. In some implementations an association between a user interface and an entity may be based on presence of one or more attributes of the entity in the user interface. For example, an association between a user interface and an entity may be based on an importance of one or more aliases of the entity in the user interface. For example, appearance of an alias of an entity in important fields and/or with great frequency in a user interface may be indicative of association of the entity to the user interface. Also, for example, an association between a user interface and an entity may be based on presence of additional and/or alternative attributes of an entity such as date of birth, place of birth, height, weight, population, geographic location(s), type of entity (e.g., person, actor, location, business, university), etc.

Take the example described above regarding the task, "Make sure you confer with Judy (555-1234) on June $2^{nd}$ at 3 pm about party plans." UI engine 122 may identify, and in some cases open or launch, a calendar user interface. In some implementations, UI engine 122 may populate one or more data points associated with the user interface. Thus, in the same example, UI engine 122 may launch a calendar entry with the date and time already set as described in the task.

UI engine 122 may identify, open and/or initiate other types of user interfaces for other types of tasks. For example, assume message 350 includes a task, "Make dinner reservations at Sal's Bistro on Tuesday." As described above, the plurality of rule paths 352a-n may be used by grammar engine 126 to analyze the annotated message output by NLP engine 124. The rule path 352 associated with making restaurant reservations may yield the highest score, which may lead to its being selected by task classification engine 128. Additionally, NLP engine 124 may have, e.g., by way of entity tagger 236 sending a query to entity engine 120, identified Sal's Bistro as an entity and tagged it accordingly in the annotated message. In some implementations, other information about Sal's Bistro not specified in message 350, such as its address and/or telephone number, may also be obtained from various sources once Sal's Bistro is tagged as an entity.

Using the above-described information, UI engine 122 may identify an appropriate user interface to assist the user in making a reservation at the restaurant. Various user interfaces 354a-m are depicted in FIG. 3 as being available for use by the user to make the reservation. A first interface 354a may be an interface to online restaurant reservation application. A second interface 354b may be a URL to a webpage, e.g., a webpage hosted by Sal's Bistro that includes an interactive interface to make reservations. Another user interface 354m may be a smart phone telephone interface, which in some cases may be initiated with Sal's Bistro's telephone number already entered, so that the user only need to press "talk" to initiate a call to Sal's. Of course, other types of interfaces are possible. In various implementations, one or more data points (e.g., interaction entities such as people or organizations, task actions, times, dates, locations, etc.) may be extracted from the annotated message and provided to whichever user interface is selected, so that the user need not provide this information manually.

Figure 4:
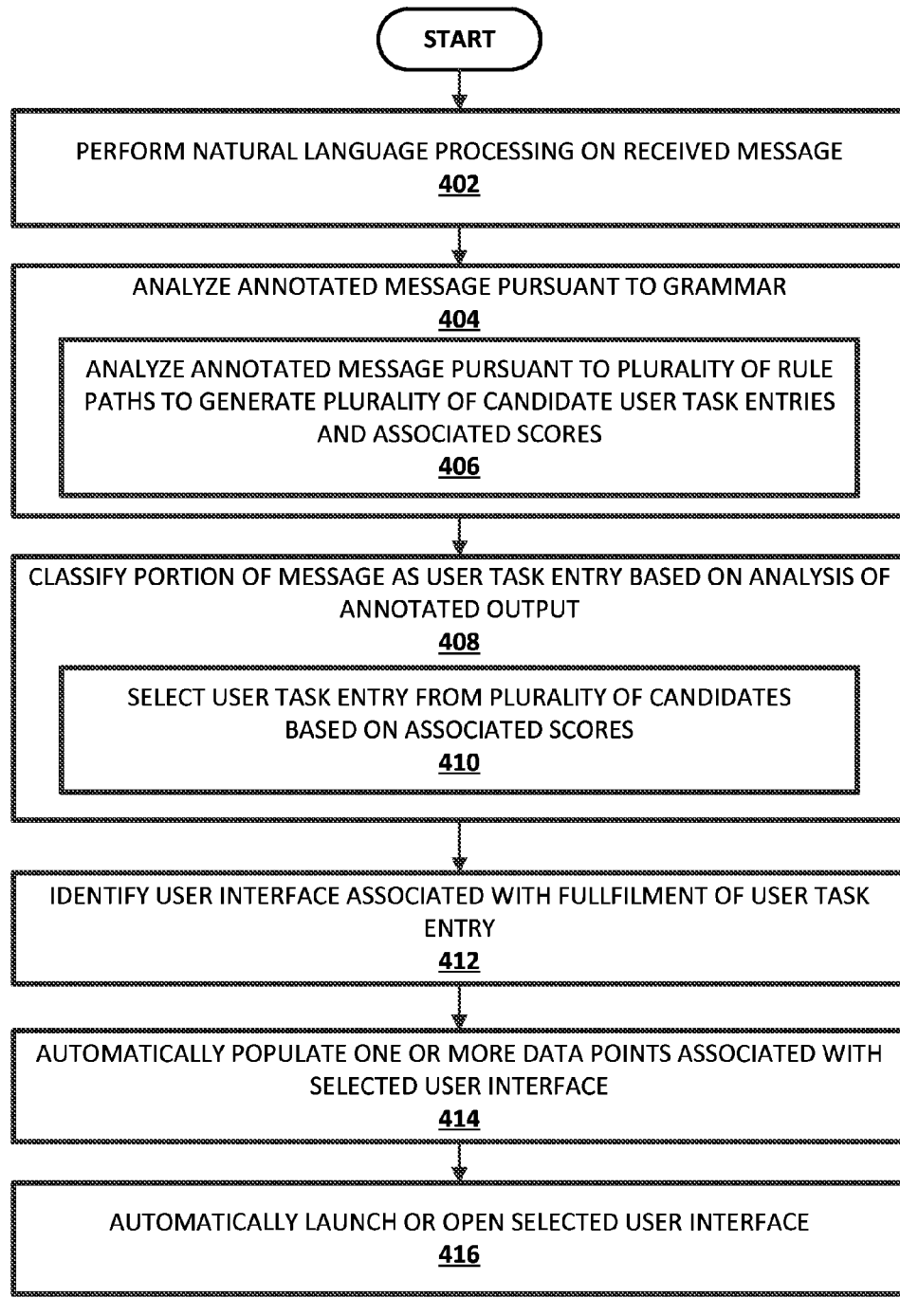
FIG. 4 depicts a flow chart illustrating an example method of identifying tasks in messages.

Referring now to FIG. 4, an example method 400 of identifying tasks in messages is described. For convenience, the operations of the flow chart are described with reference to a system that performs the operations. This system may include various components of various computer systems. For instance, some operations may be performed at the client device 106, while other operations may be performed by one or more components of user task entry system 102, such as entity engine 120, user interface engine 122, NLP engine 124, grammar engine 126, and/or task classification engine 128. Moreover, while operations of method 400 are shown in a particular order, this is not meant to be limiting. One or more operations may be reordered, omitted or added.

Method 400 may begin ("START") when a message (e.g., 350) is received and/or consumed, e.g., at client device 106 or at user task entry system 102 (e.g., in a manner that is readily accessible to client device 106). At block 402, the system may perform natural language processing on the message to generate the annotated message, including performing the operations associated with the various components depicted in FIG. 2 and described above.

At block 404, the system may analyze the annotated message pursuant to a grammar. For example, at block 406, the system may analyze the annotated message pursuant to a plurality of rule paths (e.g., 352a-n of FIG. 3) to generate a plurality of candidate user task entries and associated scores. As described above, candidates having satisfied more parameters of their respective rule paths than others may have higher scores than others. In various implementations, each rule path of the grammar, or the grammar as a whole, may be various types of grammars, such as a context-free grammar.

At block 408, the system may classify a portion of the message (e.g., a sentence, paragraph, selected words, subject line, etc.) as a user task entry based on analysis of the annotated message provided at block 402. For example, at block 410, the system may select the candidate user task entry with the highest associated score.

At block 412, the system may select one or more user interfaces associated with the selected user task entry. At block 414, the system may automatically populate one or more data points (e.g., input fields) associated with the selected user interface. For example, if the interface is an interactive webpage, client 107 may transmit an HTTP request with values to assign to various HTTP server variables. At block 416, the system may automatically launch or open the selected user interface. In some embodiments, the operations of blocks 414 and 416 may be performed in reverse.

Figure 5:
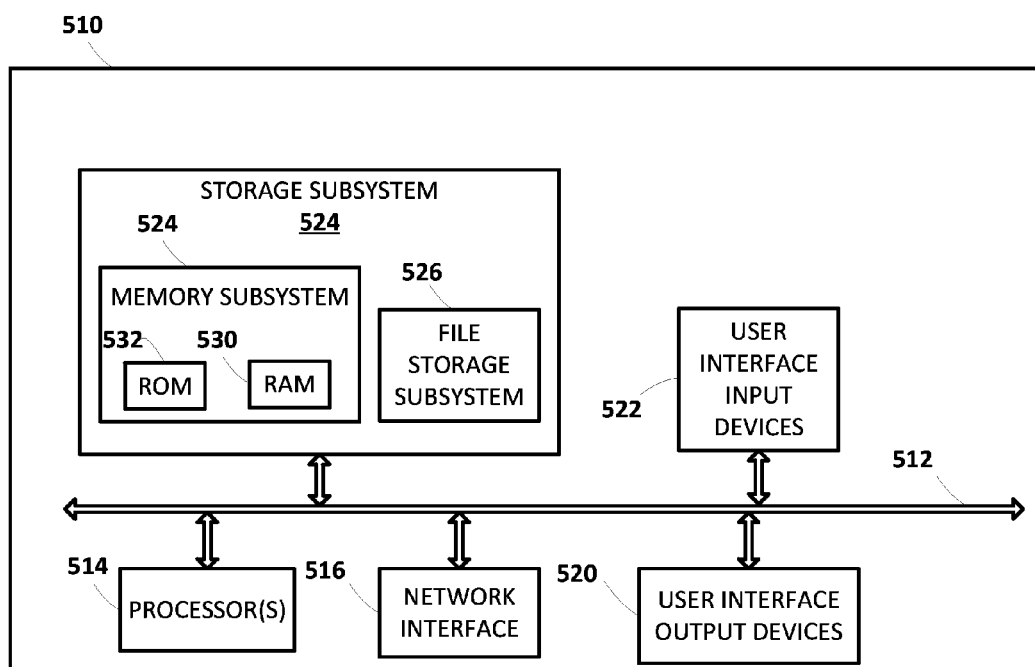
FIG. 5 schematically depicts an example architecture of a computer system.

FIG. 5 is a block diagram of an example computer system 510. Computer system 510 typically includes at least one processor 514 which communicates with a number of peripheral devices via bus subsystem 512. These peripheral devices may include a storage subsystem 524, including, for example, a memory subsystem 525 and a file storage subsystem 526, user interface output devices 520, user interface input devices 522, and a network interface subsystem 516. The input and output devices allow user interaction with computer system 510. Network interface subsystem 516 provides an interface to outside networks and is coupled to corresponding interface devices in other computer systems.

User interface input devices 522 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 510 or onto a communication network.

User interface output devices 520 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 510 to the user or to another machine or computer system.

Storage subsystem 524 stores programming and data constructs that provide the functionality of some or all of the modules described herein. For example, the storage subsystem 524 may include the logic to perform selected aspects of method 400 and/or to implement one or more of entity engine 120, user interface engine 122, NLP engine 124, grammar engine 126, and/or task classification engine 128.

These software modules are generally executed by processor 514 alone or in combination with other processors. Memory 525 used in the storage subsystem can include a number of memories including a main random access memory (RAM) 530 for storage of instructions and data during program execution and a read only memory (ROM) 532 in which fixed instructions are stored. A file storage subsystem 524 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 524 in the storage subsystem 524, or in other machines accessible by the processor(s) 514.

Bus subsystem 512 provides a mechanism for letting the various components and subsystems of computer system 510 communicate with each other as intended. Although bus subsystem 512 is shown schematically as a single bus, alternative implementations of the bus subsystem may use multiple busses.

Computer system 510 can be of varying types including a workstation, server, computing cluster, blade server, server farm, or any other data processing system or computing device. Due to the ever-changing nature of computers and networks, the description of computer system 510 depicted in FIG. 5 is intended only as a specific example for purposes of illustrating some implementations. Many other configurations of computer system 510 are possible having more or fewer components than the computer system depicted in FIG. 5.

In situations in which the systems described herein collect personal information about users, or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A computer-implemented method, comprising:
    analyzing, by a computing system, content of a message addressed to a user, wherein the message was not composed by the user;
    classifying, by the computing system, a portion of the content of the message as a task assigned to the user by one or more other individuals based on the analysis of the message;
    selecting by the computing system from a plurality of distinct user interfaces associated with a plurality of distinct software applications, based on the analysis of the content of the message, a user interface operable by the user to fulfill the task; and
    automatically populating, by the computing system, one or more data entry fields of the selected user interface that are editable by the user with information based on the analysis of the content of the message.

2. The computer-implemented method of claim 1, wherein:
    the analyzing comprises analyzing, by the computing system, the content of the message pursuant to a plurality of rule paths of a grammar to generate a plurality of candidate user tasks and associated scores; and
    the classifying comprises selecting, by the computing system, the task from the plurality of candidate user tasks based on the associated scores.

3. The computer-implemented method of claim 1, wherein the analyzing includes identifying, by the computing system, a reference to a task interaction entity of the task in the message.

4. The computer-implemented method of claim 3, wherein the analyzing further comprises classifying, by the computing system, the task interaction entity as a person, location or organization.

5. The computer-implemented method of claim 4, wherein the analyzing further comprises identifying, by the computing system, a task action of the task.

6. The computer-implemented method of claim 5, wherein selecting the user interface comprises selecting the user interface based on the task interaction entity and task action.

7. The computer-implemented method of claim 1, further comprising automatically launching or opening, by the computing system, the user interface.

8. The computer-implemented method of claim 1, further comprising selecting, by the computing system from a plurality of distinct URLs, based on the analysis of the message, a URL associated with a network-based resource that is operable by the user to fulfill the task.

9. A computer-implemented method, comprising:
   analyzing, by a computing system, content of a communication of a user;
   classifying, by the computing system, a portion of the content of the communication as a task assigned to the user based on the analysis of the content of the communication;
   selecting by the computing system from an index of distinct user interfaces associated with a plurality of distinct software applications, based on the analysis of the content of the communication, at least one user interface operable by the user to fulfill the task; and
   providing, by the computing system as visual output, at least one visual prompt corresponding to the at least one user interface operable by the user to fulfill the task.

10. The computer-implemented method of claim 9, further comprising prepopulating one or more data entry fields associated with the at least one user interface with information based on the analysis of the content of the communication.

11. The computer-implemented method of claim 10, wherein the one or more data entry fields are editable by the user.

12. The computer-implemented method of claim 9, wherein the communication was composed by one or more other individuals different than the user.

13. The computer-implemented method of claim 9, wherein:
   the analyzing comprises analyzing, by the computing system, the content of the communication pursuant to a plurality of rule paths of a grammar to generate a plurality of candidate user tasks and associated scores; and
   the classifying comprises selecting, by the computing system, the task from the plurality of candidate user tasks based on the associated scores.

14. The computer-implemented method of claim 9, wherein the analyzing includes identifying, by the computing system, a reference to a task interaction entity of the task in the communication.

15. The computer-implemented method of claim 14, wherein the analyzing further comprises classifying, by the computing system, the task interaction entity as a person, location or organization.

16. The computer-implemented method of claim 15, wherein the analyzing further comprises identifying, by the computing system, a task action of the task.

17. The computer-implemented method of claim 16, wherein selecting the at least one user interface comprises selecting the at least one user interface based on the task interaction entity and task action.

18. A computer-implemented method comprising:
   analyzing, by a computing system, content of a communication sent to a user, wherein the communication was not composed by the user;
   identifying, by the computing system based on the analyzing, a plurality of candidate user tasks assigned to the user;
   selecting by the computing system from an index of distinct user interfaces associated with a plurality of distinct software applications, based on the identifying, a respective one or more user interfaces operable by the user to fulfill the plurality of candidate user tasks; and
   providing, by the computing system as output, a plurality of prompts corresponding to the one or more user interfaces operable by the user.

19. The computer-implemented method of claim 18, wherein the plurality of prompts include one or more visual prompts.

20. The computer-implemented method of claim 18, wherein the plurality of prompts include one or more audible prompts.

* * * * *